July 16, 1929.  G. E. VINNEDGE  1,721,140
WINDSHIELD WIPER
Filed Nov. 25, 1925  2 Sheets-Sheet 1
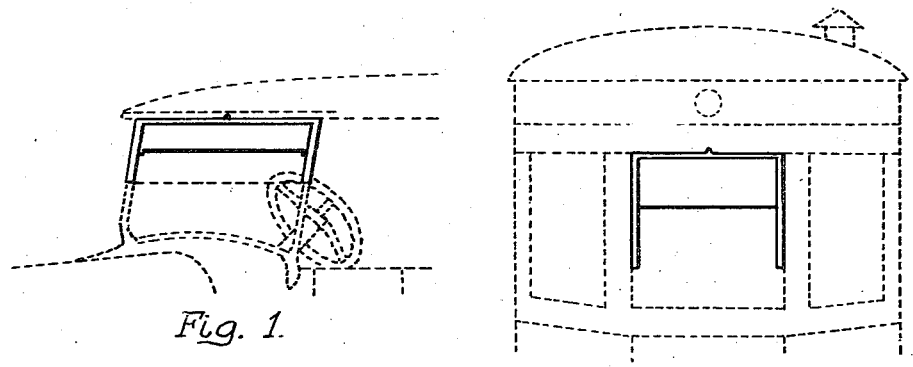
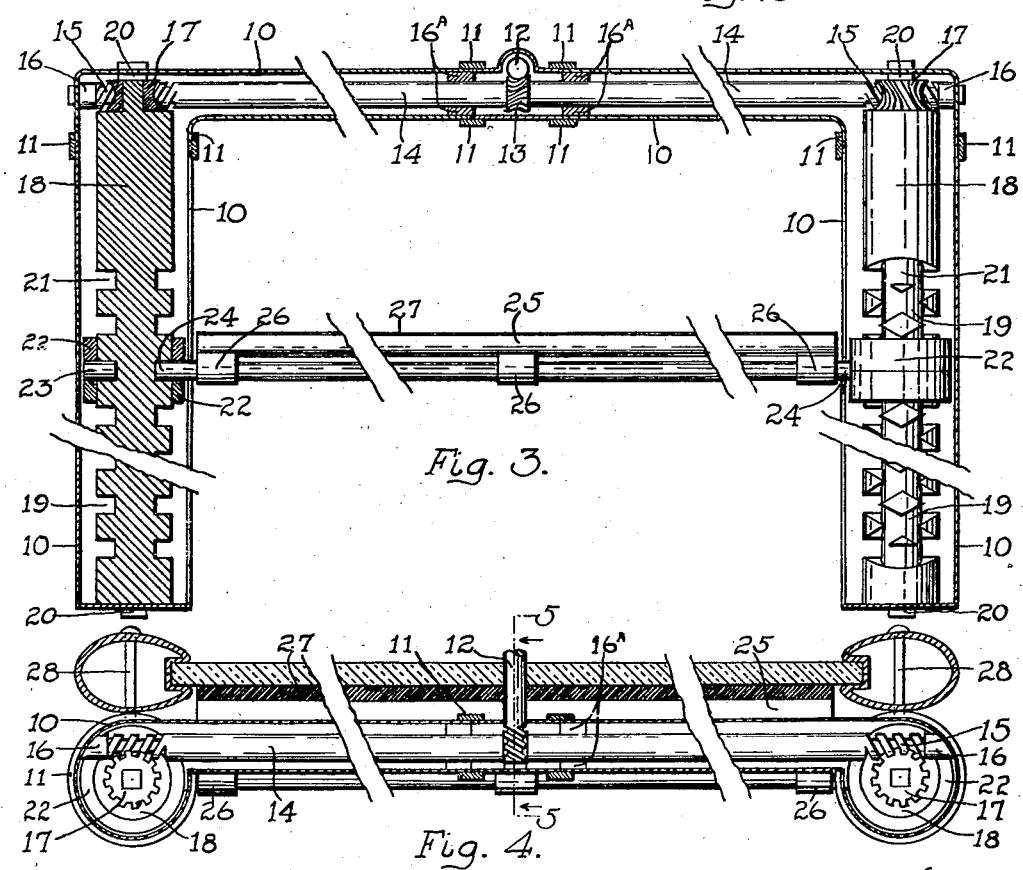

July 16, 1929.  G. E. VINNEDGE  1,721,140
WINDSHIELD WIPER
Filed Nov. 25, 1925  2 Sheets-Sheet 2

Geo. E. Vinnedge
INVENTOR

Patented July 16, 1929.

1,721,140

UNITED STATES PATENT OFFICE.

GEORGE E. VINNEDGE, OF ORANGE, TEXAS.

WINDSHIELD WIPER.

Application filed November 25, 1925. Serial No. 71,465.

My invention relates to improvements in mechanical devices for removing obstructions to clear vision through automobile windshields, street car windows and the like, and the objects of my improvement are first, to provide a windshield wiper which will wipe vapor, rain, snow or the like from the entire exterior side of the glass with a positive stroke; second, to provide a wiper of inconspicuous design and size and with a minimum of interference with the vision of the driver when in operation or when inoperative; third: to provide a wiper adaptable to any size of windshield or window, of sturdy construction and with strong and positive action, and, fourth, to provide a wiper of compact and inexpensive construction and silent in action.

Other objects and advantages of this invention will appear as the following description is read in connection with the accompanying drawings.

In the drawings:—

Figure 1 is a view of the windshield wiper of my invention as applied to the ordinary two-leaf windshield of an automobile.

Figure 2 is a view of my invention as applied to the front window of a street car or interurban car.

Figure 3 is a front elevation of the windshield wiper of my invention with the front half of the casing removed to expose the interior, and with one side of the mechanism in section to better show its parts.

Figure 4 is a top view of Figure 3, but with the top of the casing removed to expose the mechanism.

Figure 5:
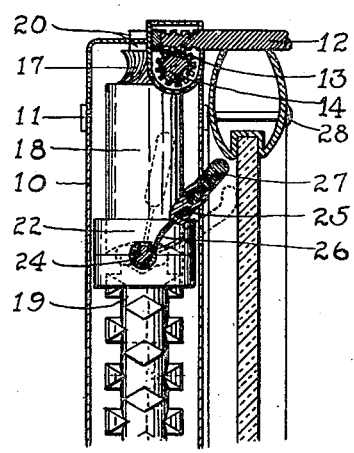
Figure 5 is a section on the line 5—5 of Figure 4.
Figure 6:
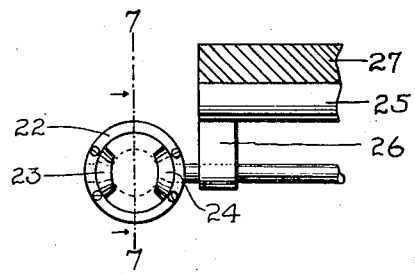

Figure 6 is a detail view of the sleeve 22 and the lugs or bearings 23 and 24.

Figure 7:
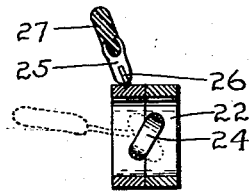

Figure 7 is a section on the line 7—7 of Figure 6.

Referring specifically to the drawings, wherein like numerals denote corresponding parts throughout, 10 is a casing or housing enclosing the working parts with the exception of the wiper bar 25, fastened together by sleeve connections 11. 12 is a worm shaft extending through the windshield or window frame and connected to a motor, not shown, furnishing the operating power. This worm shaft 12 engages a gear 13 affixed to another shaft 14 revolving in bearings 16 and 16A and having at each end a worm 15 engaging the gears 17 which are affixed to the rotors 18. These rotors revolve in bearings 20 at each end. The rotors each have a diametrically opposite pair of grooves passing spirally around them in a right hand direction and a diametrically opposite pair of similar grooves passing spirally around them in a left hand or opposite direction, each right hand groove connecting to a corresponding left hand groove in a curve 21 at each end of the rotor in such manner that each groove of each pair is in effect a continuous groove, changing its direction at each end of rotor. The sleeves 22 shown in detail in Figures 6 and 7, move freely over the rotors 18 and each sleeve is provided with two or more movable lugs or bearings 23 and 24, diametrically opposite, which engage the corresponding grooves 19 and being of such shape and size as to move freely through said grooves and to pass the intersections thereof without being deflected and to pass through the curved groove 21 at the ends of rotors where the direction of the groove is changed. These lugs or bearings 23 and 24 carry with them the sleeves 22 as the rotors revolve and are given a reciprocating motion from one end to the other of the rotors. The lugs or bearings 24 are extended through the sleeves 22 and are attached to the wiper bar 25 by means of spring arms 26, causing wiper bar to move in a reciprocating manner with the sleeves and lugs as the rotors revolve. As the lugs 24 follow the grooves 19 they are inclined at an angle corresponding with the helix angle of the groove and being attached to the wiper bar, cause said wiper bar to be also inclined correspondingly so that as the wiper bar moves downwardly its edge of rubber or other suitable material is pressed closely against the exterior surface of the glass, squeegeeing the surface free from moisture, rain or snow, and as the lug 24 changes its inclination with the helical angle of the groove at the lower end of the rotor by passing through the curve 21, the wiper bar is caused to incline away from the surface of the glass on its upward motion. The casing 10 may be attached to the windshield or window frame by means of screws 28 or by metal clips integral with said casing.

The invention is susceptible of various changes in its form, proportions and minor details of construction and the right is herein reserved to make such changes as properly fall within the scope of the appended claim.

Having described the invention, what is claimed is:—

A device of the kind described, comprising a Horsfall screw mounted adjacent the surface to be cleaned, means for rotating said screw, a carriage on said screw having pivoted means traveling in the threads of the screw for reciprocating said carriage, a wiper carried by and rotatable with said pivoted means, the wiper engaging the surface to be cleaned during movement of the carriage in one direction and adapted to be removed from contact with said surface at the end of the stroke when the pivoted means rotates to carry the carriage in a reverse direction.

In testimony whereof I affix my signature.

GEORGE E. VINNEDGE.